United States Patent [19]

Otake et al.

[11] 4,319,505
[45] Mar. 16, 1982

[54] PENDULUM-TYPE FLYING SHEAR

[75] Inventors: Yukio Otake; Yuji Kikuchi; Tsuneo Nakanishi, all of Hitachi; Keiji Miyakozawa, Katsuta, all of Japan

[73] Assignee: Hitachi, Ltd., Tokyo, Japan

[21] Appl. No.: 145,147

[22] Filed: Apr. 30, 1980

Related U.S. Application Data

[63] Continuation of Ser. No. 911,805, Jun. 2, 1978, abandoned.

[30] Foreign Application Priority Data

Jul. 22, 1977 [JP] Japan .................. 52-88096

[51] Int. Cl.³ .............................. B23D 25/06
[52] U.S. Cl. ...................... 83/295; 83/311; 83/316
[58] Field of Search ............. 83/316, 317, 295, 288, 83/311

[56] References Cited

U.S. PATENT DOCUMENTS

| | | | |
|---|---|---|---|
| 1,878,121 | 9/1932 | Edwards | 83/317 |
| 1,996,617 | 4/1935 | Hahn | 83/317 X |
| 2,144,308 | 1/1939 | Hallden | 83/317 X |
| 2,261,007 | 10/1941 | Talbot | 83/316 X |
| 2,351,868 | 6/1944 | Morgan | 83/317 X |
| 2,415,325 | 2/1947 | Wood | 83/316 |
| 2,800,179 | 7/1957 | Münchbach | 83/316 |
| 3,543,624 | 12/1970 | Richards | 83/316 X |
| 3,548,698 | 12/1970 | Münchbach | 83/311 |
| 3,568,879 | 3/1975 | Takakura et al. | 83/316 |

FOREIGN PATENT DOCUMENTS 41-16477 9/1966 Japan .
44-18039 8/1969 Japan .
48-11554 4/1973 Japan .

OTHER PUBLICATIONS

Iron & Steelworks Engineering (Journal of the Iron & Steel Institute, Nov., 1955, pp. 239-240).
DEMAG W84.3 Pendulum Shear 1965.

Primary Examiner—Frank T. Yost
Attorney, Agent, or Firm—Craig and Antonelli

[57] ABSTRACT

A pendulum-type flying shear having a speed range of a high speed to a low speed for shearing a hot rolled material having a large cross section in which there are provided vertically movable upper and lower cutting blades within a frame mounted on a crank shaft and the blades are moved towards and away from each other to shear the material while the frame is oscillated. Particularly, while the crank shaft is rotated at a constant speed, the oscillating speed of the frame is synchronized with the speed of movement of the material to be sheared and speed synchronizing apparatus including a gear device and the like is interposed between the oscillating device and the driving device so that a good shearing performance can be obtained with a small capacity of the driving device.

18 Claims, 11 Drawing Figures

PENDULUM-TYPE FLYING SHEAR

This is a continuation of application Ser. No. 911,805, filed June 2, 1978, now abandoned.

BACKGROUND OF THE INVENTION

This invention relates to a shear for shearing a material during its movement and, more particularly, to a pendulum-type flying shear for shearing a material moving between vertically movable cutting blades within a frame mounted on a crank shaft, while the frame is subjected to an oscillating movement.

In such a pendulum-type flying shear, the energy required for shearing the material is equal to the speed of the material passing through the shear multiplied by the cross-section of the material, as is same as in the theorem of continuity in the field of the fluid dynamics. In a specific shear, therefore, it will be necessary to reduce the shearing speed or the speed of movement of the material to be sheared, when the latter has a larger cross-section.

It will, therefore, be understood that if a steplessly variable speed gear effective to the pendulum-type flying shear is provided therein materials having large and small cross-sections will be sheared by the single shear. However, there has never been such a steplessly variable speed gear as is of a large capacity, high efficiency and small and cheap type, and thus a direct current electric motor capable of making the speed control has hitherto been used to vary the shearing speed by controlling the speed of the motor itself. Furthermore, the speed varying operation can be achieved by combining a constant speed electric motor and a toothed wheel gearing, but such arrangement can not provide a steplessly variable speed transmission and the size of the speed gear and the required area of the installation are very large so that this system can not have been used.

In the pendulum-type flying shear operated by the speed control system with the direct current electric motor, the capacity of the motor is determined in consideration of the following conditions:
  (i) Shearing energy or inertia energy should be generated which is required for shearing an allowable maximum cross-section of the material at an allowable minimum speed (condition to the maximum output), and
  (ii) said energy can be generated within the minimum shearing cycle (the shearing length divided by the maximum material speed) (the momentary output being large).

In these two conditions, the second condition (ii) is closely concerned with the production efficiency, so that the minimum shearing cycle tends to become small, but, in this case, the capacity of the motor should become large and thus a large capacity of the motor is to be used. In case of using such a large capacity of the motor, however, there will be caused a problem that the efficiency is lowered when a large cross-section of the material is sheared at a low speed. This results from the fact that the efficiency of the motor is maximum when it is driven at the rated speed and lowers as it is driven at a low speed.

In addition, as the motor capacity becomes large, the control device and the power source installation will become large, and the installing cost and running cost will also become very high.

In the hot rolling installations, furthermore, for the purpose of recent improvement of the productivity and product quality, high speed and continuous rolling lines have been developed. As a result, it is required for the pendulum-type flying shear to provide a wide speed range from a high speed to a low speed and the shearing operation of a large cross-section of the material by a small power. However, as the speed of movement of the material becomes high and as the cross-section becomes large, the impact force applied to the shear when shearing operation becomes large, so that it becomes necessary to synchronize the shearing speed or the speed of movement along the line of the upper and lower cutting blades with the speed of movement of the material. The speed synchronization is an important factor in view points of not only lowering the impact force, but also shearing the material at the desired shearing position to enhance the shearing accuracy and provide a good sheared section.

Hitherto, as a flying shear for shearing a strip conveyed from a hot rolling mill, while the strip is moving, a drum type flying shear or a four-link type flying shear has mainly been used. The drum type flying shear is arranged such that upper and lower cutting blades are secured to a pair of rotating drums disposed on the upper and lower sides, respectively, of the material, the drums being rotated at a speed synchronized with the material speed to shear the material bitten between the blades. In this type of shear, however, there are problems that the blades are engaged with the material with an angle of inclination relative to the latter so that relative sliding movement is caused between the blades and the material, and the blades are interfered with each other and the adjustment of the gap between the blades or the lapping amount is difficult.

On the other hand, the four-link type flying shear is arranged such that two pairs of links for forming parallelograms on upper and lower sides and opposite sides, and upper and lower blades are secured to arms constituting the parallelograms and rotated in synchronous relationship with the speed of moving material to make the shearing operation. This type of shear is disadvantageous in that although the blades are vertically moved to provide a longer blade life than in the drum type flying shear there is required a relatively large number of arms forming the links and the installation becomes large and heavy in order to maintain a sufficient strength.

As a billet shearing device in a continuous casting installation, there has been known a so-called pendulum-type shear in which vertically movable cutting blades are provided within a frame oscillatingly mounted on a crank shaft to shear the billet between the blades, as described, for example, in Journal of the Iron and Steel Institute, November, 1955, page 6. In this type of shear, when the material is moved at a very low speed, such as within the range of 0.1 m/min to 2.0 m/min, as a billet, there is no problem, because the shearing operation is made with the frame urged as a pendulum by the material bitten between the blades, but such shear is unsuitable as a shear incorporated in a rolling line of the hot rolling installation in which the speed of movement of the material is very high, such as 10 m/min to 200 m/min, and the range of the speed to be selectable is large. Thus, the conventional pendulum-type shear is disadvantageous in that no means are provided for synchronizing the speed of the frame with that of the material and the impact between the blades and the material is too large to break the blades or/and shear in case of the hot rolling installation in which the speed of the material is large.

For the purpose of shearing a thin sheet, there has often been used a so-called oscillatortype flying shear in which the material is sheared by an upper cutting blade secured to an oscillating frame and a mating lower cutting blade movable upward and downward within the frame by an eccentric mechanism. However, this type of shear is also disadvantageous in that the center of gravity of the frame is positioned above the center of oscillation, so that the gravity due to the weight of the oscillating portion, in addition to the varying power, is applied thereto, and if the capacity of the shear increases the weight of the oscillating portion will accordingly become increased to provide a construction resisting the reaction force. Therefore, it is unsuitable for shearing a thick sheet.

The following are prior publications showing the background of the present invention.

PRIOR PUBLICATIONS (1) Published Japanese Patent No. 41-16477
(2) Published Japanese Patent No. 48-11554
(3) Published Japanese Patent No. 44-18039
(4) Iron and Steelworks Engineering (Journal of the Iron and Steel Institute, November, 1955, pages 239–240)
(5) DEMAG W84.3 Pendulum Shear

SUMMARY OF THE INVENTION

The object of the present invention is to provide a pendulum-type flying shear suitable for a hot rolling installation in which the above-mentioned disadvantages of the prior arts are removed and the speed range is wide from a low speed to a high speed and a large cross-section of the material to be sheared can accurately be sheared with a small power and the construction is small in comparison with the conventional shear.

According to the present invention, there is provided a pendulum-type flying shear comprising a main crank shaft rotated by driving means, a frame rotatably mounted on a first eccentric portion of said main crank shaft, a lower cutting blade fixed to said frame, an upper cutting blade rotatably mounted on a second eccentric portion of said main crank shaft, to move reciprocately within said frame and oscillating means for causing an oscillating movement of said frame about the first eccentric portion of said main crank shaft, in which said main crank shaft is rotated at a constant speed irrespective of the speed of movement of a material to be sheared and said oscillating means causes the oscillating movement of said frame in synchronous relationship with the speed of movement of the material whereby said driving means and said oscillating means start to operate in co-operation with a shearing instruction, and shears the material moving between said upper and lower cutting blades.

DESCRIPTION OF THE PREFERRED EMBODIMENTS

Figure 1:
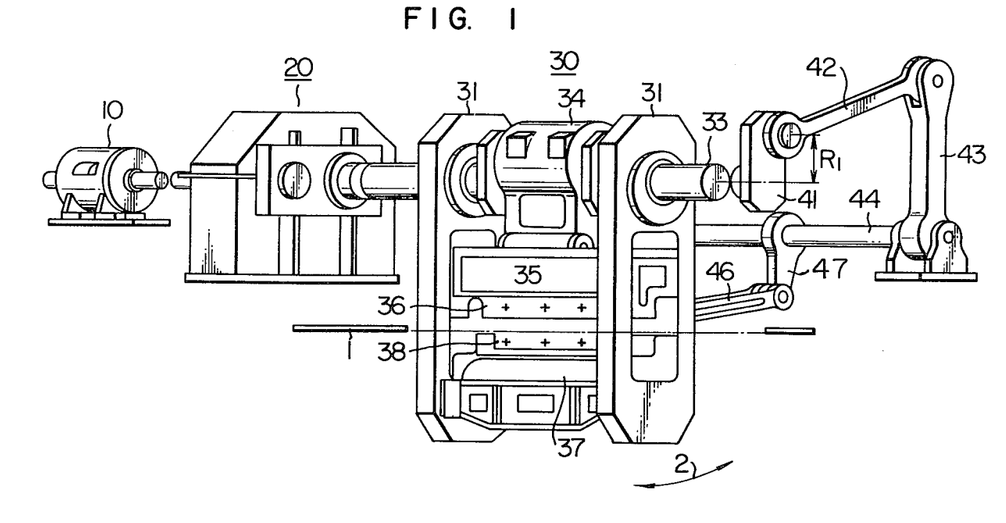
FIG. 1 is a perspective view showing one embodiment of the present invention.
Figure 2:
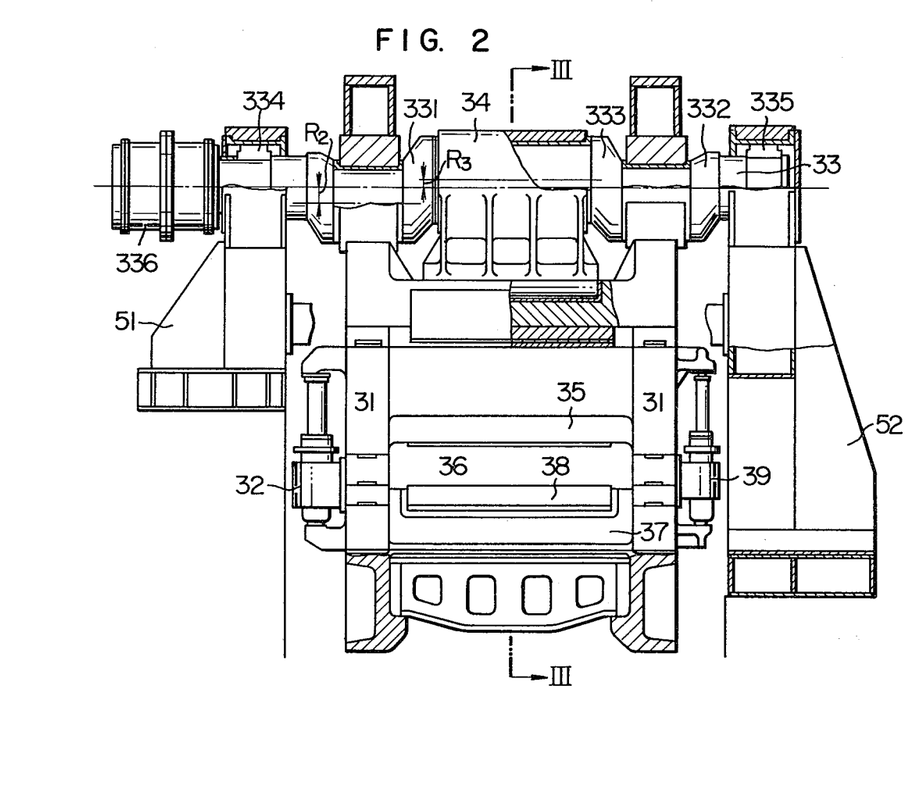
FIG. 2 is a front view of the main crank shaft portion of the shear shown in FIG. 1 as viewed against the direction of flow of the material.

FIG. 1 diagrammatically shows an overall construction of pendulum-type flying shear in accordance with one embodiment of the present invention. A main portion 30 of the shear is driven through a reduction gear 20 by a direct-current electric motor 10 maintained at a constant speed. The rotating force derived from the motor 10 while reduced by the reduction gear 20 to an intended speed is transmitted to a driving- or operating-side frame 31 through a main crank shaft 33. The frame 31 is rotatably mounted on an eccentric portion of the main crank shaft 33. Provided between the frames 31 is another eccentric portion of the main crank shaft on which a connecting rod 34 is rotatably mounted as is in the case of the frames 31. A lower portion of the connecting rod 34 is connected with an upper cutting blade table 35 for fixing an upper cutting blade 36, the table being adapted to slidably move within the frames in the vertical direction. The lower portions of the frames 31 are provided with a lower cutting blade table 37 for fixing a lower cutting blade 38.

Another axis of the reduction gear transmits a rotating force for driving an eccentric crank 41 through a speed synchronizing mechanism (not shown in FIG. 1). This rotating force of the eccentric crank is transmitted to the frames 31 through an arm 42, an angular movable arm 43, a torque transmitting shaft 44, an angular movable arm 47 and a rod 46 to cause oscillating movements of the frames 31 about the eccentric portion of the crank shaft 33 in the direction of the arrow 2. Such oscillating movements are in synchronous relationship with the speed of movement of a material 1 to be sheared, and the oscillating mechanism will be described hereinlater.

The main portion 30 of the shear will next be described by reference to FIGS. 2 to 5. The rotating force transmitted from the reduction gear 20 through a coupling 336 is transmitted as a rotating force for the main crank shaft 33 rotatably supported by bearings 334, 335 mounted on bases 51, 52. The main crank shaft 33 is provided with eccentric portions having predetermined phase angles, and the frames 31 integrally formed with each other are mounted for oscillating movements on first eccentric portions 331 and 332 having an eccentric radius $R_2$. The connecting rod 34 for moving the upper cutting blade 36 in the vertical direction is rotatably mounted on second eccentric portion having an eccentric radius $R_3$. Provided on left and right sides of the upper and lower cutting blade tables 35 and 37 are upper cutting blade balancing cylinder 39 and lower cutting blade urging cylinder 32 having pistons and rods for varying the gap between the upper and lower cutting blades 36 and 38, such that the gap can be increased by operating the cylinders. In this condition, the lower cutting blade table 37 together with the upper cutting blade table 35 are pulled out from a window portion of the frame by cutting blade replacing means disposed perpendicular to a line not shown. Thus, there will be no need to make the replacement of the cutting blades under bad conditions of the location or environment in the line.

Figure 3:
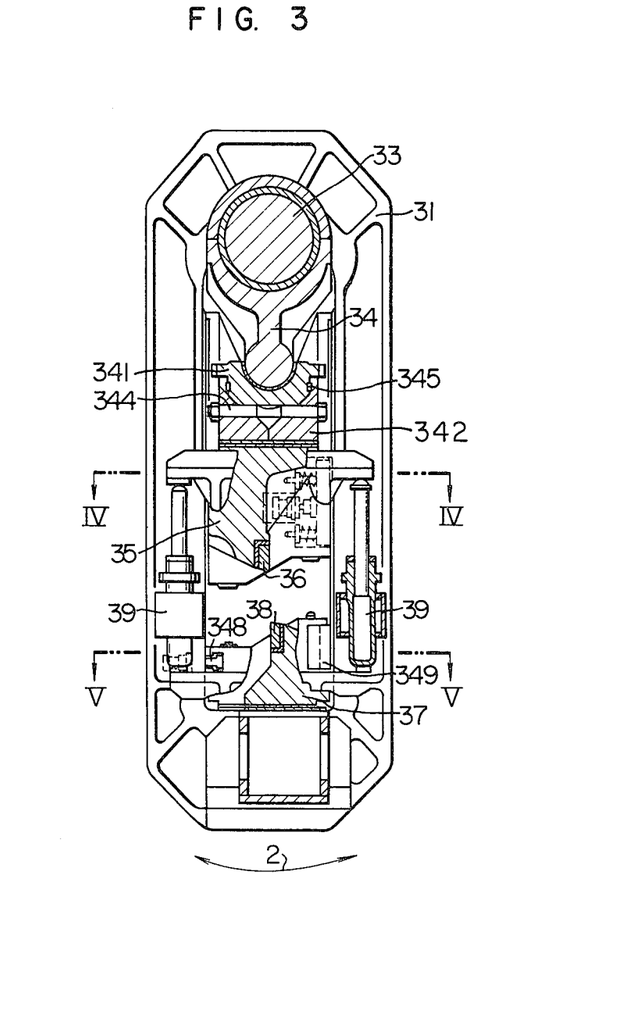
FIG 3. is a side sectional view of the shear of FIG. 1 particularly taken along a line III—III of FIG. 2.

As shown in FIG. 3, an end of the connecting rod 34 is connected with a V-shaped connecting block 341 which is, in turn, connected with a reinforcing block 342 through a connecting key 345. The reinforcing block 342 comprises a pair of centrally divided halves fixed by a tension bolt 344 to each other to form a V-shaped cavity engaged with the connecting block 341. The tension bolt 344 is formed at its mid portion with a constriction which is broken out when a determined overload is applied thereto, and serves as a safety device for interrupting the transmission of the load to the driving mechanism, when the material to be sheared has a lower temperature than the determined value or when an excess load is applied to the upper cutting blade 36 by virtue of the plate to be sheared having a larger thickness or width than the determined value.

Figure 4:
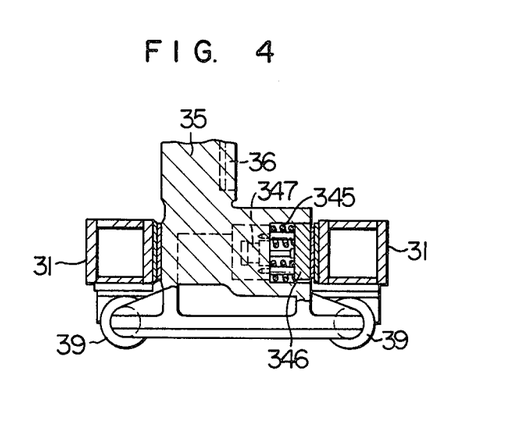
FIGS. 4 and 5 are part-sectional views showing a device for adjusting the gap of the shear and taken along lines IV—IV and V—V, respectively, of FIG. 3.

As shown in detail in FIG. 4, furthermore, provided between the upper cutting blade table 35 and the frame 31 are springs 345 for urging the table 35 against the other frame 31 during the shearing operation, thereby maintaining the table 35 in a fixed position. When it is desired to replace the upper cutting blade 36 with new one, a keep plate 346 inserted for releasing the springs 345 is urged by a releasing cylinder 347 to release the springs 345.

Figure 5:
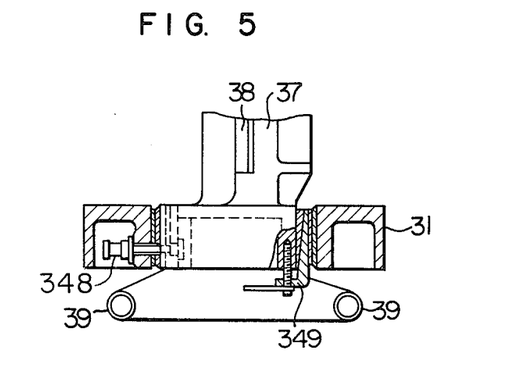

In respect of the lower cutting blade table 37, similarly as shown in detail in FIG. 5, an urging cylinder 348 is provided between the table 37 and the frame 31 to urge the table 37 against the frame 31 in the same direction as the side pressure applied to the table 37 during the shearing operation.

On the opposite side of the lower cutting blade table, there is provided a wedge 349 between it and the frame 31 to make an adjustment of the gap between the upper and lower cutting blades 36 and 38.

In this manner, with this embodiment, even when the frames 31 are oscillated the upper cutting blade table is not moved laterally relative to the frame 31, and the gap between the upper and lower cutting blades can easily be adjusted.

Figure 6:
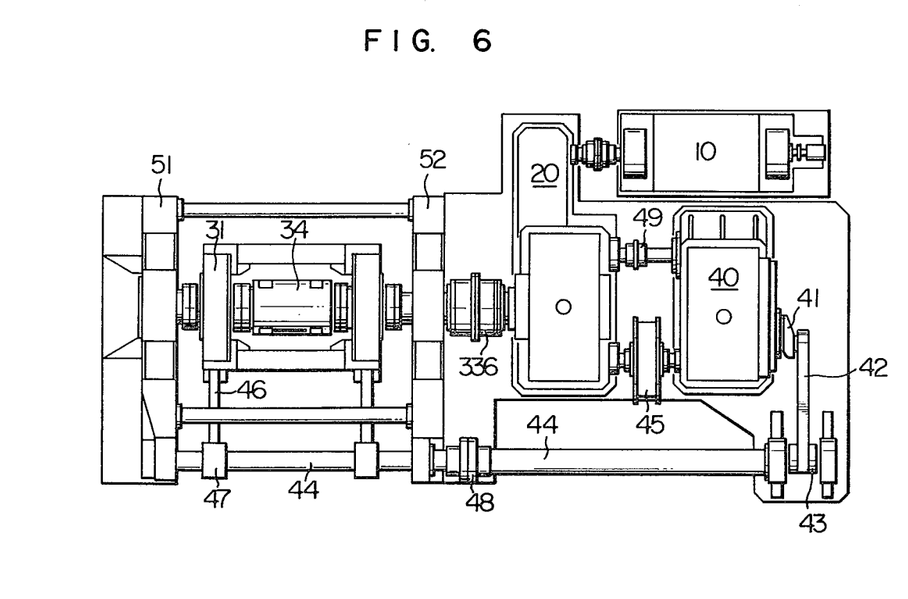
FIG. 6 is a plan view of the embodiment of the invention shown in FIG. 1.

The arrangment of the device for causing the oscillating movements of the frames 31 in synchronous relationship with the speed of movement of the material will next be described by reference to FIG. 6. One end of torque transmitting shafts 44 connected by a coupling 48 to each other is connected to the eccentric crank 41 through the angularly movable arm 43 and the rod 42. A shaft end of the speed synchronizing mechanism including planetary gear mechanism and differential gear mechanism to be described hereinafter is connected to the eccentric crank 41 and two other shaft ends are connected through a coupling 49 and clutch 45, respectively, to the reduction gear 20.

The clutch 45 is provided in such a manner that when an excess load is applied to the cutting blades no excess load is transmitted to the reduction gear 20 and the driving motor 10.

In order to cause the oscillating movements of the frames 31 in synchronous relationship with the speed of movement of the material, the reduction gear 20 driven by the motor 10, and the speed synchronizing oscillating mechanism including the eccentric crank 41, the rod 42, the angularly movable arm 43, the torque transmitting shaft 44, the angularly movable arm 47 and the rod 46 are disposed adjacent to the driving side of the main portion of the shear, i.e. on the side perpendicular to the flow of the material and on which the motor 10 is disposed. This results in the facts that the driving side has a sufficient space to make the replacement of the blades and that there can be provided a speed synchronizing device having a high strength without obstructing the operator's view on the operating side, because of the provision of a large size of the speed synchronizing device corresponding to the increased capacity of the shear. There is a further effect that the construction of the upper portions of the frames is simple so that a ceiling crane can effectively be used when maintaining or inspecting the shear.

Figure 7:
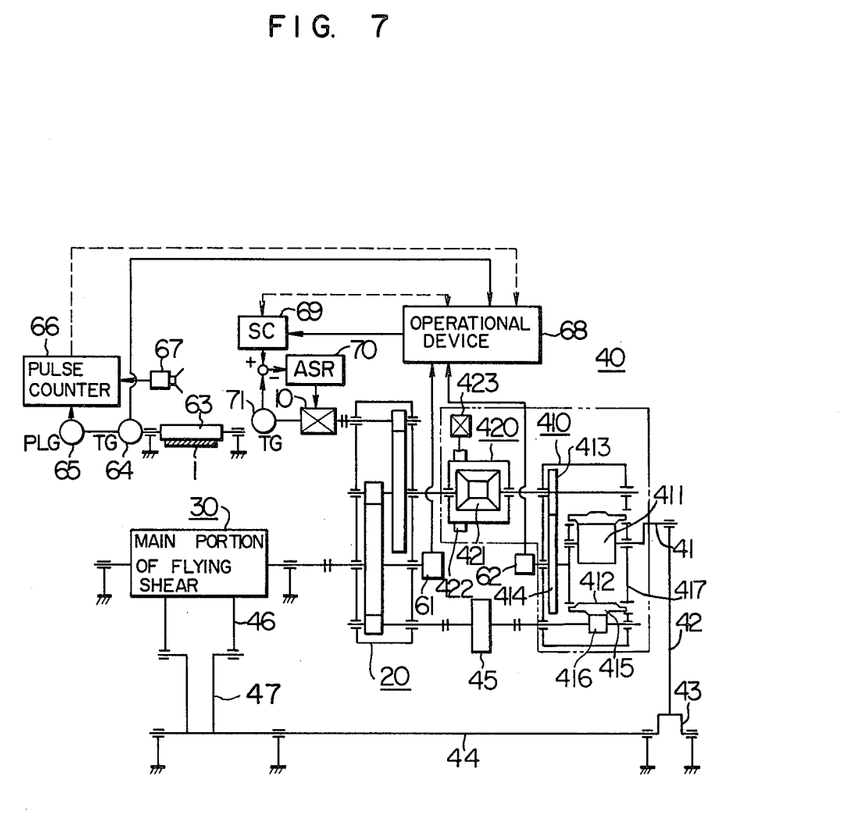
FIG. 7 is a schematic diagram showing the speed synchronizing control mechanism.

The mechanism for causing the oscillating movements synchronous with the material feeding speed will next be described by reference to FIG. 7. The eccentric crank 41 is connected to one shaft end of the speed synchronizing device 40, that is to a pinion 411 for eccentricity of planetary gear mechanism 410. The pinion 411 is in tooth-to-tooth engagement with an internal gear 412 for eccentricity which is driven through a clutch 45, a gear 415 and a gear 416. Furthermore, a support 417, which supports the center axis of a pinion 411, is rotated by a rotating force transmitted from the driving device through differential gears 420 to gears 413, 414.

In order to vary the rotating radius $R_1$ of the eccentric crank 41, a worm 422 of differential gear device 421 of the differential gear mechanism 420 is rotated by a motor 423 to rotate the pinion 411 relative to the internal gear 412. By this relative rotation of the pinion 411, the eccentric radius $R_1$ of the crank 41 is varied. When the eccentric radius $R_1$ is set to a desired value, the rotation of the motor 423 is ceased and the frames 31 will cause oscillating movements at a desired speed.

Figure 8:
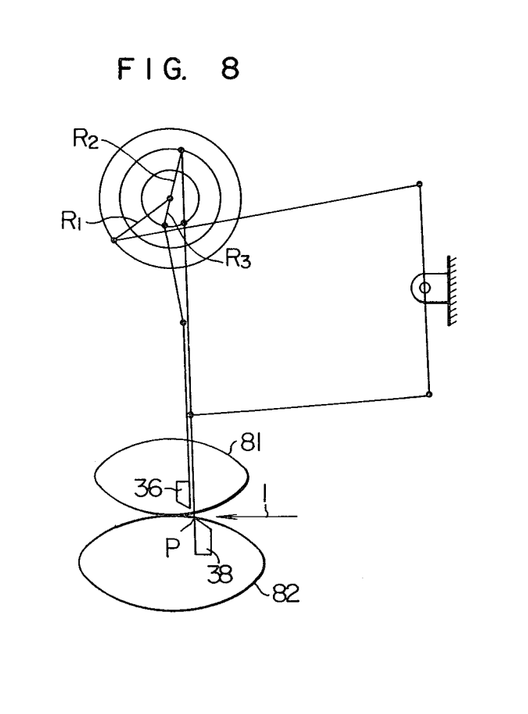
FIGS. 8 and 9 are diagrams showing the principle of variations in the speed.
Figure 9:
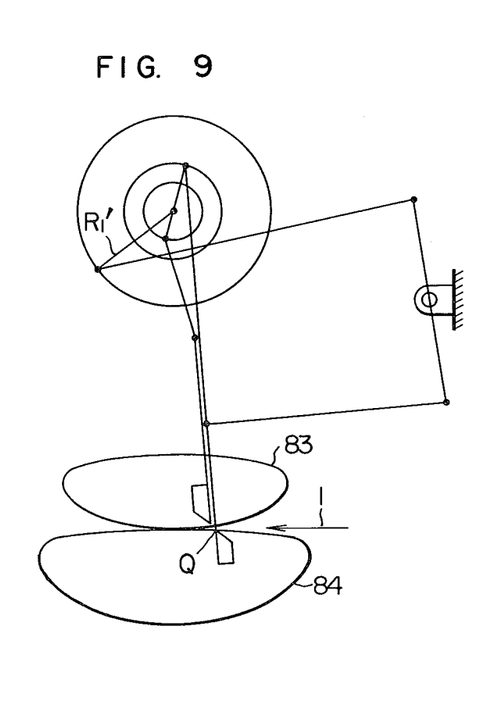

FIGS. 8 and 9 show a condition in which the eccentric radius $R_1$ of the eccentric crank 41 is varied to $R_1'$ by the planetary gear mechanism 410 with the differential gear mechanism 420 rotated. When the eccentric crank 41 is set to have the desired eccentric radius $R_1$ and the oscillating movement of the frames 31 is caused, the upper and lower cutting blades 36 and 38 fixed to the frames 31 are moved to draw foci 81 and 82, respectively. In this condition, the shearing operation is initiated when the lower cutting blade 38 is at a position P. When the eccentric radius $R_1$ is varied to $R_1'$ in accordance with the speed of movement of the material to be sheared, the amplitude of the oscillating movement of the frames 31 is varied such that the upper and lower cutting blades 36 and 38 are moved to draw different foci 83 and 84, respectively, and the point at which the shearing operation is initiated is shifted to a point Q. Accordingly, the point at which the shearing operation is initiated is shifted, when the speed of oscillating movement of the frames is synchronized with the speed of movement of the material. FIG. 7 will again be referred to in order to explain control means for making a precise shearing operation at a desired position, even when such point is shifted.

The angular position of the main crank shaft 33 is detected by a detector 61 for detecting the absolute position of the main crank. The angular position of the planetary gear mechanism 410 is also detected by a detector 62 for detecting the absolute position of the planetary gear. Furthermore, the speed of feeding the material 1 to be sheared is detected by a speed meter 64 of a measuring roller 63. The position of the material is detected through a pulse generator 65 of the measuring roller 63 and a pulse counter 66. The operation of the pulse counter 66 is controlled by a metal detector 67. These detected signals of the angular position of the main crank, the angular position of the planetary gear, the speed of feeding the material and the position of the material are supplied to operational device 68 the output of which is supplied as a control signal through a speed controller 69 into a speed control device 70 in which it is compared with the output of a speed meter 71 of the motor 10 to control the start of the motor 10 and the acceleration and reduction patterns thereof.

In this manner, with the present embodiment the position of the upper and lower cutting blades at which the shearing operation is initiated is precisely detected by detecting the angular positions of the main crank shaft and the planetary gear, and in accordance with these detected values the precise shearing operation can be made at the desired shearing position with the speed of oscillating movement of the cutting blades synchronized with the speed of feeding the material.

In the embodiment described above, the oscillating movement of the frames 31 and the angular movement of the main crank shaft are made by the single motor 10 and the synchronization of the oscillating movement of the frames 31 with the speed of feeding the material to be sheared is made by varying the eccentric radius of the eccentric crank for connecting the main crank shaft driving motor and the frame oscillating device. With the present invention, however, it is possible to use a speed synchronizing motor for synchronizing the frame oscillating speed with the material feeding speed, in addition to the main crank shaft driving motor. It is further possible to automatically control both of these motors in accordance with the material speed and the size of the area to be sheared, such that the opening and speed of the blades at the initiation of shearing are set to optimum values.

Figure 10:
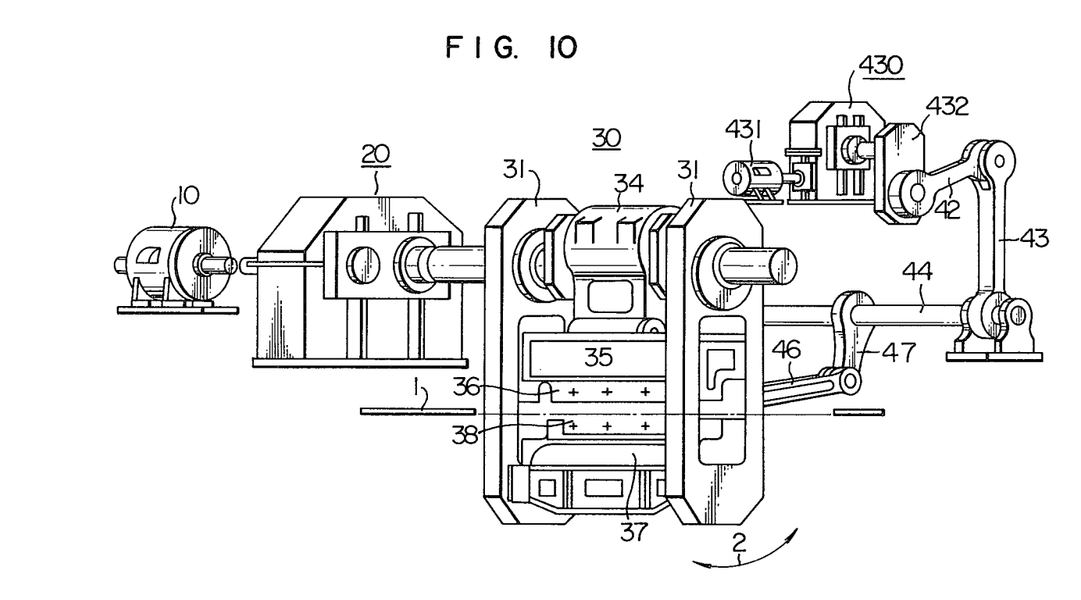
FIG. 10 is a perspective view of another embodiment of the invention.

FIG. 10 shows another embodiment of the present invention provided with such a speed synchronizing motor. The same reference numerals as in FIG. 1 designate the same parts and no description thereto will be given hereinbelow.

The frames 31 are connected with the rod 46 for causing the oscillating movement of the frames in the direction of movement of the material 1 to be sheared, the rod 46 being connected to the arm 47 supported by the torque transmitting shaft 44. Secured to the shaft 44 is a further arm 43 which is connected to the rod 42. This rod 42 is coupled to a speed synchronizing crank 432 having a constant eccentric radius and rotated by the speed synchronizing motor 431 through a fly-wheel 433 and a worm reduction device 430.

Figure 11:
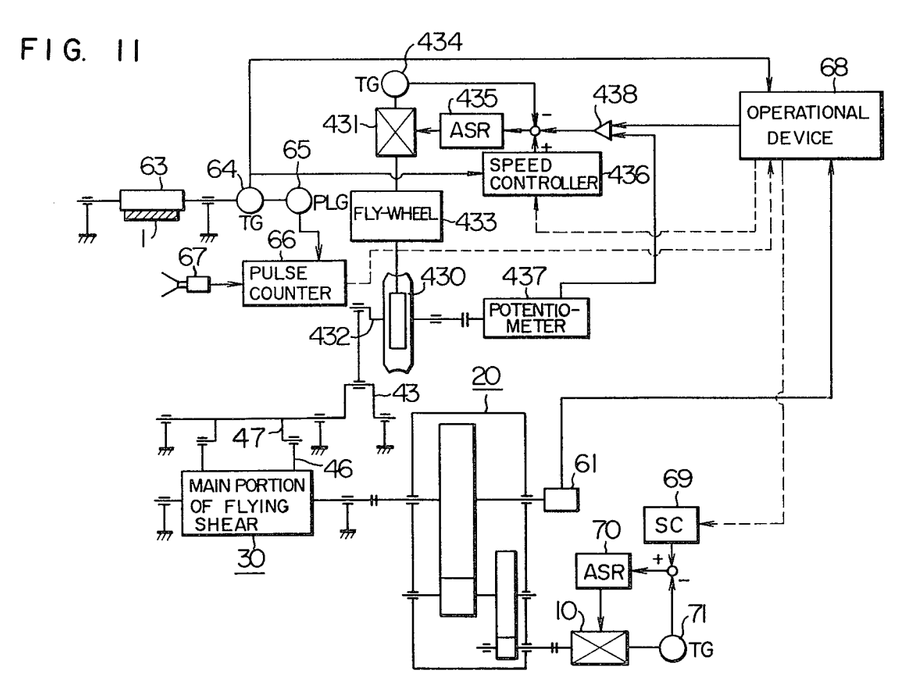
FIG. 11 is a schematic diagram showing the speed synchronizing mechanism of the embodiment shown in FIG. 10.

With this, the horizontal speed of the cutting blades when shearing operation, and thus the oscillating speed of the frames are controlled in synchronous with the speed of feeding the material to be sheared. FIG. 11 shows such a control mechanism and the same reference numerals as in FIGS. 7 and 10 designate the same parts.

The speed of the material 1 is detected by the measuring roller 63 and the speed meter 64 and these detected values are transmitted to the pulse generator 65, the operational device 68 and the speed controller 435, respectively. The output of the pulse generator 65 is further transmitted to the pulse counter 66. The position of the material 1 is detected by the metal detector 67 and this detected value is transmitted to the pulse counter 66. The output of the pulse counter 66 is delivered to said operational device 68 as a signal of the shearing position of the material 1. The operational device 68 transmits the start instructions in accordance with the thickness and speed of the material to the speed controllers 436 and 69.

The output of the speed controller 69 is transmitted to the main crank driving motor 10 through the speed control device 70 which makes the starting and stopping operations at the determined speed while detecting the rotating speed of the motor 10 by the speed meter 71.

The speed synchronizing motor 431, while its rotational speed is detected by the speed meter 434, is controlled by the instructions of the speed synchronizing device 435 in accordance with the instructions of the speed controller 436 so that the oscillating movement of the frames 31 is started and stopped in synchronous with the speed of the material.

The angular positions of the main crank shaft 33 and the speed synchronizing crank 432 are detected by potentiometers 61 and 437, respectively. The phases of the detected values of the potentiometers 61 and 437 are compared with each other by the operational devices 68 and 438 and a control is made to synchronize these phases with the intended values thereby adjusting the speed of the motor 431.

In the above embodiment the worm reduction device 430 and the fly-wheel 433 are interposed between the speed synchronizing crank 432 and the speed synchronizing motor 431, such that the inertia force resulting from the oscillating movement of the frames 31 cannot be directly transmitted to the speed synchronizing motor 431 and thus the motor 431 may be of a minimum allowable strength and capacity. In case of the material being relatively small, furthermore, the worm reduction device 430 may be replaced by a different type of the reduction device only provided with the fly-wheel 433 thereby lowering the reaction torque applied to the motor 431.

In this manner, with this embodiment the main crank driving motor and the speed synchronizing motor are mutually automatically controlled to set the opening and speed of the cutting blades to the optimum values when initiating the shearing operation and thus there are advantages that the construction is simple and the speed of the material can widely be varied from the high speed region to the low speed region, and the material having a large shearing cross-section can precisely be sheared by a small power.

The examples have hereinabove been described in which as the driving motor 10 a direct current electric motor easily making the speed control is rotated at a rated rotating speed and the fine adjustment of the rotating speed is made by ASR to control the shearing position and the speed synchronization is made by maintaining the driving motor at a constant speed and varying the radius of the eccentric crank, or by using the speed controllable speed synchronizing electric motor 431 only for causing the oscillating movements. This results in the fact that the driving motor 10 requiring the large capacity is rotated at a substantially constant speed so as to be always driven at its maximum efficiency and thus the capacity of the driving motor can largely be reduced in comparison with the conventional equipments. With an example of the present invention, the motor capacity can be reduced by about 1/4.3 in comparison with a conventional four-link type flying shear and the machine weight can also be reduced by 1/1.5. In case of a shear permitted to have a relatively rough shearing accuracy, however, it is possible that the motor 10 is arranged by an alternating current electric motor suitable for constant rotation, and in this case there is no need to provide the motor and control system therefor and thus the cost can largely be reduced.

As described above, according to the present invention the precise shearing of a large cross-section of the material to be sheared can be achieved at a speed ranging from the low speed to the high speed, and the driving motor is driven at the substantially rated speed so that the motor may be of a small size and small power to largely reduce the power consumption required for the shearing operation. Furthermore, according to the present invention the center of gravity of the frames is positioned below the center of the oscillating movement so that the gravity of the weight of the oscillating portion acts to diminish the varying power. Therefore, there is an effect that as a large capacity is required a small and light weight construction can be used.

We claim:

1. A pendulum-type flying shear installed in a rolling line operative in various speeds for cropping a rolled material, wherein said flying shear is activated each time when one shearing operation is required and then stopped, said flying shear comprising a main crank shaft having first and second eccentric portions which are eccentric from a center line of the main crankshaft in different directions, respectively, a frame rotatably mounted on and suspended from said first eccentric portion of said main crankshaft, a lower cutting blade fixed to said frame, an upper cutting blade cooperating with said lower blade to shear a material to be sheared, said upper cutting blade being guided by said frame and connected to said second eccentric portion of said main crankshaft so that on rotation of said main crankshaft said lower and upper cutting blades move toward and away from each other, oscillating means for oscillating said frame about the first eccentric portion of said main crank shaft in synchronous relationship with movement of the material to be sheared so that at the instance of shearing said blades move substantially along a path of movement of said material to be sheared at a speed substantially the same as that of the movement of said material, and driving means for rotating said main crankshaft at a predetermined constant speed irrespective of the speed of movement of said material to be sheared, whereby a material to be sheared having a large shearing cross-section can be precisely sheared by a small power.

2. A pendulum-type flying shear as set forth in claim 1 in which said oscillating means includes an oscillating crank mechanism rotated by said driving means and having speed synchronizing means for varying its eccentric radius in response to the speed of movement of the material, and a link mechanism for transmitting the eccentric motion of said oscillating crank mechanism to said frame to cause the oscillating movement thereof.

3. A pendulum-type flying shear as set forth in claim 2 in which said speed synchronizing means includes a planetary gear mechanism having a sun gear and a planetary gear each rotated by said driving means, a differential gear mechanism interposed between said driving means and said planetary gear mechanism, and said differential gear mechanism being operated to vary the eccentric radius of said oscillating crank mechanism.

4. A pendulum type flying shear as set forth in claim 2 in which there are provided means for detecting the speed of movement of the material to be sheared, means for detecting the angular position of the main crankshaft, means for detecting the eccentric radius and means for calculating the shearing position from the detected values of the speed of movement of the material, the angular position of the main crankshaft and the eccentric radius, whereby the material is sheared at a desired portion and at the oscillating speed synchronous with the speed of movement of the materials.

5. A pendulum-type flying shear as set forth in claim 4 in which said driving means includes an electric motor rotating at a determined speed and a reduction gear for transmitting the rotational force of said motor to said main crank shaft, said oscillating crank mechanism being arranged such that a rotational force derived from another shaft end of said reduction gear is transmitted through said link mechanism to said frame, and said motor, said reduction gear and said oscillating crank mechanism being disposed on a same side relative to said frame.

6. A pendulum-type flying shear as set forth in claim 1 in which said upper cutting blade includes a connecting rod rotatably mounted on the second eccentric portion of said main crank shaft, a connecting block and a reinforcing block connected to a lower portion of the connecting rod, an upper cutting blade table connected to a lower portion of the reinforcing block and attached with said upper cutting blade, and said connecting and reinforcing blocks being interconnected by a member breakable at the time when an overload is applied thereto.

7. A pendulum-type flying shear as set forth in claim 1 in which said oscillating means includes driving means only for speed synchronization and independent of the driving means for rotating said main crank shaft, and said oscillating means is synchronized by said driving means for speed synchronization with the speed of movement of the material.

8. A pendulum-type flying shear as set forth in claim 1, wherein said driving means comprises an electric motor rotating at a determined constant speed.

9. A pendulum-type flying shear as set forth in claim 1, wherein said driving means comprises an electric motor rotating at a predetermined constant speed and a reduction gear for transmitting the rotational force of said motor to said main crankshaft, and wherein said oscillating means is connected to said reduction gear so as to be driven so that said oscillating means oscillates said frame at a constant cycle said oscillating means including means for varying an amplitude of oscillation of said frame depending on the speed of movement of said material to be sheared.

10. A pendulum-type flying shear as set forth in claim 9, wherein said driving means and oscillating means are disposed on a same side relative to said frame.

11. A pendulum-type flying shear comprising a main crankshaft having first and second eccentric portions which are eccentric from a center line of the main crankshaft in different directions, respectively, a frame rotatably mounted on and suspended from said first eccentric portion of said main crankshaft, a lower cutting blade fixed to said frame, an upper cutting blade cooperating with said lower blade to shear a material to be sheared, said upper cutting blade being guided by said frame and connected to said second eccentric portion of said main crankshaft so that on rotation of said main crankshaft, said lower and upper cutting blades move toward and away from each other, oscillating means for oscillating said frame about the first eccentric portion of said main crankshaft in synchronous relationship with movement of the material to be sheared so that at the instance of shearing, said blades move substantially along a path of movement of said material to be sheared at a speed substantially the same as that of the movement of said material, and driving means for rotating said main crankshaft at a predetermined constant speed irrespective of the speed of movement of said material to be sheared in which said oscillating means includes an oscillating crank mechanism rotated by said driving means and having speed synchronizing means for varying its eccentric radius in response to the speed of movement of the material, and a link mechanism for transmitting the eccentric motion of said oscillating crank mechanism to said frame to cause the oscillating movement thereof, and in which said speed synchronizing means includes a planetary gear mechanism having a sun gear and a planetary gear each rotated by said driving means, a differential gear mechanism interposed between said driving means and said planetary gear mechanism, and said differential gear mechanism being operated to vary the eccentric radius of said oscillating crank mechanism.

12. A pendulum type flying shear comprising a main crankshaft having first and second eccentric portions which are eccentric from a center line of the main crankshaft in different directions, respectively, a frame rotatably mounted on and suspended from said first eccentric portion of said main crankshaft, a lower cutting blade fixed to said frame, an upper cutting blade cooperating with said lower blade to shear a material to be sheared, said upper cutting blade being guided by said frame and connected to said second eccentric portion of said main crankshaft so that on rotation of said main crankshaft said lower and upper cutting blades move toward and away from each other, oscillating means for oscillating said frame about the first eccentric portion of said main crankshaft in synchronous relationship with movement of the material to be sheared so that at the instance of shearing, said blades move substantially along a path of movement of said material to be sheared at a speed substantially the same as that of the movement of said material, and driving means for rotating said main crankshaft at a predetermined constant speed irrespective of the speed of movement of said material to be sheared, in which said oscillating means includes an oscillating crank mechanism rotated by said driving means and having speed synchronizing means for varying its eccentric radius in response to the speed of movement of the material, and a link mechanism for transmitting the eccentric motion of said oscillating crank mechanism to said frame to cause the oscillating movement thereof, and in which there are provided means for detecting the speed of movement of the material to be sheared, means for detecting the angular position of the main crankshaft, means for detecting the eccentric radius and means for calculating the shearing position from the detected values of the speed of movement of the material, the angular position of the main crankshaft and the eccentric radius, whereby the material is sheared at a desired portion and at the oscillating speed synchronous with the speed of movement of the materials.

13. A pendulum-type flying shear as set forth in claim 12 in which said driving means includes an electric motor rotating at a determined speed and a reduction gear for transmitting the rotational force of said motor to said main crankshaft, said oscillating crank mechanism being arranged such that a rotational force derived from another shaft end of said reduction gear is transmitted through said link mechanism to said frame, and said motor, said reduction gear and said oscillating crank mechanism being disposed on a same side relative to said frame.

14. A pendulum-type flying shear comprising a main crankshaft having first and second eccentric portions which are eccentric from a center line of the main crankshaft in different directions, respectively, a frame rotatably mounted on and suspended from said first eccentric portion of said main crankshaft, a lower cutting blade fixed to said frame, an upper cutting blade cooperating with said lower blade to shear a material to be sheared, said upper cutting blade being guided by said frame and connected to said second eccentric portion of said main crankshaft so that on rotation of said main crankshaft, said lower and upper cutting blades move toward and away from each other, oscillating means for oscillating said frame about the first eccentric portion of said main crankshaft in synchronous relationship with movement of the material to be sheared so that at the instance of shearing, said blades move substantially along a path of movement of said material to be sheared at a speed substantially the same as that of the movement of said material, and driving means for rotating said main crankshaft at a predetermined constant speed irrespective of the speed of movement of said material to be sheared, in which said upper cutting blade includes a connecting rod rotatably mounted on the second eccentric portion of said main crankshaft, a connecting block and a reinforcing block connected to a lower portion of the connecting rod, an upper cutting blade table connected to a lower portion of the reinforcing block and attached with said upper cutting blade, and said connecting and reinforcing blocks being interconnected by a member breakable at the time when an overload is applied thereto.

15. A pendulum-type flying shear comprising a main crankshaft having first and second eccentric portions which are eccentric from a center line of the main crankshaft in different directions, respectively, a frame rotatably mounted on and suspended from said first eccentric portion of said main crankshaft, a lower cutting blade fixed to said frame, an upper cutting blade cooperating with said lower blade to shear a material to be sheared, said upper cutting blade being guided by said frame and connected to said second eccentric portion of said main crankshaft so that on rotation of said main crankshaft, said lower and upper cutting blades move toward and away from each other, oscillating means for oscillating said frame about the first eccentric portion of said main crankshaft in synchronous relationship with movement of the material to be sheared so that at the instance of shearing said blades move substantially along a path of movement of said material to be sheared at a speed substantially the same as that of the movement of said material, driving means for rotating said main crankshaft at a predetermined constant speed irrespective of the speed of movement of said material to be sheared, and control means for initiating the operation of said shear to make a precise shearing operation at a desired position on the moving material.

16. A pendulum-type flying shear as set forth in claim 15, wherein said control means includes means for detecting the position and speed of movement of the material to be sheared.

17. A pendulum-type flying shear as set forth in claim 16, wherein said control means further includes means for detecting the angular position of the main crankshaft.

18. A pendulum-type flying shear as set forth in claim 1, wherein said shear is installed in a rolling line operative in various speeds over a wide speed range from a low speed to a high speed such as 10 m./min. to 200 m./min.

* * * * *